(12) United States Patent
Pinhanez (10) Patent No.: US 8,938,405 B2
(45) Date of Patent: Jan. 20, 2015

(54) CLASSIFYING ACTIVITY USING PROBABILISTIC MODELS

(75) Inventor: Claudio Santos Pinhanez, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 13/360,878

(22) Filed: Jan. 30, 2012

(65) Prior Publication Data

US 2013/0198114 A1 Aug. 1, 2013

(51) Int. Cl.
*G06N 5/00* (2006.01)
*G06F 15/18* (2006.01)

(52) U.S. Cl.
USPC .............................. 706/12; 706/52

(58) Field of Classification Search
CPC .......... G06F 17/30; G06Q 10/00; G06N 5/00; G06N 15/18
USPC ..................................... 706/12, 52
See application file for complete search history.

(56) References Cited

U.S. PATENT DOCUMENTS

| | | | |
|---|---|---|---|
| 7,647,631 B2 | 1/2010 | Sima | |
| 7,693,817 B2 | 4/2010 | Dumais et al. | |
| 7,908,371 B2 | 3/2011 | Friedman et al. | |
| 7,941,383 B2 | 5/2011 | Heck | |
| 8,121,890 B2 | 2/2012 | Pinhanez | |
| 8,521,675 B2 * | 8/2013 | Boyle et al. | 706/45 |
| 2004/0236843 A1 * | 11/2004 | Wing et al. | 709/219 |
| 2005/0015678 A1 * | 1/2005 | Miller | 714/38 |
| 2006/0100874 A1 * | 5/2006 | Oblinger et al. | 704/256.3 |
| 2008/0300879 A1 * | 12/2008 | Bouchard et al. | 704/256 |
| 2009/0164395 A1 * | 6/2009 | Heck | 706/16 |
| 2009/0292778 A1 * | 11/2009 | Makar et al. | 709/206 |
| 2009/0328200 A1 * | 12/2009 | Phoha et al. | 726/19 |
| 2010/0005169 A1 * | 1/2010 | Von Hilgers | 709/224 |
| 2010/0169474 A1 | 7/2010 | Beckett, III et al. | |
| 2011/0055122 A1 | 3/2011 | Andreoli | |
| 2011/0289076 A1 * | 11/2011 | Boyle et al. | 707/723 |
| 2012/0191629 A1 * | 7/2012 | Shae et al. | 706/11 |
| 2013/0013535 A1 * | 1/2013 | Punera et al. | 706/12 |

OTHER PUBLICATIONS

Meuter et al., Choosing Among Alternative Service Delivery Modes: An Investigation of Customer Trial of Self-Service Technologies, Journal of Marketing, vol. 69, Apr. 2005, pp. 61-83.
Rabiner et al. An Introduction to Hidden Markov Models, IEEE ASSP Magazine, vol. 3 (1), pp. 4-16, 1986.

(Continued)

*Primary Examiner* — Jeffrey A Gaffin
*Assistant Examiner* — Dave Misir
(74) *Attorney, Agent, or Firm* — Ryan, Mason & Lewis, LLP (57) ABSTRACT

A method, an apparatus and an article of manufacture for classifying customer activity in an automated customer support system. The method includes obtaining input from the automated customer support system, wherein the input comprises an observable measurement of customer activity in the automated customer support system, computing a probability that the input corresponds to one of one or more probabilistic models, and using the computed probability to classify the customer activity in the automated customer support system by considering the probabilistic model corresponding to a highest computed probability.

24 Claims, 3 Drawing Sheets

(56) References Cited

OTHER PUBLICATIONS

Sparacino, Sto(ry)chastics: A Bayesian Network Architecture for User Modeling and Computational Storytelling for Interactive Spaces, In Proc. of UbiComp'03, LNCS 2864, Seattle, Washington, 2003.

Starner et al., Real-Time American Sign Language Recognition from Video Using Hidden Markov Models, in Proc. of the IEEE-PAMI International Symposium on Computer Vision, Coral Gables, Florida, 1995.

Ivanov et al., Video Surveillance of Interactions, in Proc. of the CVPR'99 Workshop on Visual Surveillance, Fort Collins, Colorado, 1998.

Darrell et al., Space-Time Gestures, in Proc. of CVPR'93, 1993.

Chen et al., Intelligent Business Prediction in Context-Awareness Services Based on Hidden Markov Model (HMM), downloaded Mar. 16, 2012.

Cannataro et al., A Probabilistic Adaptive Hypermedia System, 2001, IEEE, pp. 411-415.

Deng et al., A New Hiddent Markov Model with Application to Classification, Proceedings of the 6th World Congress on Intelligent Control and Automation, Jun. 21-23, 2006, Dalian, China.

Disclosed Anonymously, A Method and System Application of Dynamic Bayesian Networks and Probabilistic Models for Network Event Correlation, Aug. 20, 2010, pp. 1-4.

\* cited by examiner

FIG. 4

CLASSIFYING ACTIVITY USING PROBABILISTIC MODELS

FIELD OF THE INVENTION

Embodiments of the invention generally relate to information technology, and, more particularly, to classification systems.

BACKGROUND

While customer support may be provided either in person or via phone by human agents, recent years have witnessed the appearance of a large number of automated systems that allow customers to obtain support without human contact. Examples include automated voice response system (VRS) and Internet-based websites. However, measurement of those automated customer support systems has proved to be challenging. Common measures involve the classification of customer contacts with the automated system and include the need to classify the contact in specific categories, such as success or failure. This can be particularly important in a case of technical support systems where determining whether the customer solves his problem is an essential measure of success.

In agent-based customer support systems, the success or failure of the interaction can be determined by the agent, as well other measures such as how much time the user spent solving his or her problem. However, measuring the usefulness of those automatic customer support systems often resorts to customer surveys or interviews, which demand the customer's goodwill or compensation. In such cases, the measure can become biased by unhappy customers who accept doing surveys to vent their frustration with the system, or by the particular demographics of the people who accept the compensation. In particular, when trying to measure how productive a user was in his or her interaction, survey-based measurements can affect the results in unpredictable ways.

Accordingly, there is a need for techniques that can examine the traces of what a user did in an automatic system (for instance, which documents he or she read, which options were chosen from menus, and which information was provided), and based thereon, classify the interaction according to pre-specified categories.

SUMMARY

In one aspect of the present invention, techniques for classifying activity using probabilistic models are provided. An exemplary computer-implemented method for classifying customer activity in an automated customer support system can include steps of obtaining input from the automated customer support system, wherein the input comprises an observable measurement of customer activity in the automated customer support system, computing a probability that the input corresponds to one of one or more probabilistic models, and using the computed probability to classify the customer activity in the automated customer support system by considering the probabilistic model corresponding to a highest computed probability.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes classifying user activity in automated customer support systems using probabilistic models. Automated customer support systems can include, by way of example, voice-response systems and internet websites. Input of the classification system can include any observable measurement of the customer's interaction with the automated system. This can include, by way of example, documents the customer/user read, which options were chosen from menus, which information was provided by the system, and perceptual measurements of customer/user affective states.

In contrast to existing approaches, an aspect of the invention includes modeling user activity to identify user success or failure, for example, in getting information from a website. Also, classifying user activity is carried out without intervention of the user. Accordingly, probabilistic models are used to determine patterns of usage corresponding to success or failure of a user (for example, in using a website). An embodiment of the invention also includes enabling multiple cues which prevent situations such as when the user scrolls the document without reading. For example, an embodiment of the invention can include cues for documents that were sent to a printer by the user, which often is a signal of useful information found by the user.

In at least one embodiment of the invention, a probabilistic model with hidden states is used to allow the modeling of hidden states of the user (such as the state of succeeding in solving a problem) of which there is no direct measurement of activity. Although hidden states, by definition, cannot be directly measured, they make the probabilistic models more intelligible to the developer of the system and allow better structuring of the system. An example of a hidden state is when the user, after finding a possible solution of a problem, actually tries to solve his or her problem. Although the system is not likely to detect the actual attempt to solve the problem, the inclusion of a hidden state indicating the attempt in the model make it much more intelligible and, at the same time, allows the probabilistic recognition process to use the hidden state to allocate time to the hidden states. As detailed herein, an embodiment of the invention can also include using Hidden Markov Models (HMMs) as the probabilistic model for the classification system.

An aspect of the invention additionally includes training probabilistic models using labeled data sets. Having data sets with sets of interaction data of users with the system where the actual activity type of the user is known may allow improvements in the internal parameters of the system. For example, a system based on HMMs can have its performance improved by the use of techniques such as the Baum-Welch re-estimation algorithm.

As additionally described herein, an embodiment of the invention can include combining agent-generated information and machine-captured data and using the combined data to classify each customer contact. In the case of hybrid customer support systems where the users can also contact human agents during the use of the system, information about the solution process can be captured manually by the agent and used as part of the input data to the classifying process. For instance, the agent may log that the user has tried a solution described in the support system, and this information can be used to identify a state in the activity model. Also, captured data can be segmented into distinct contacts using probabilistic models. For instance, a search of information on very distinct subjects or very long periods of inactivity are often an indication that the captured data contains multiple contacts. The captured data can include, for example, information about periods of time where the customer is not interacting with the automated system.

In accordance with an aspect of the invention, a classification system M is based on a set of probabilistic models: $C=\{c_1, c_2, \ldots c_q\}$. In an example embodiment of the invention, the set of probabilistic models can be created manually by the developers of the system and the probabilities associated with each model can be determined manually by the developers of the system. Also, another example embodiment of the invention can include the use of standard training methods based on labeled data sets. Each probabilistic model $c_i$, can compute the probability that an observable sequence $O=o_1, o_2, \ldots o_n$ fits with the model, $Pr(c_i|O)$. Therefore, given an observable sequence O, the classification system M can compute the most likely classification of the sequence by computing: $M(O)=\arg \max Pr(c_i|O)$.

As noted herein, the observable sequence can be any measurement of the customer's interaction with the automated system, such as documents read, which options were chosen from menus, which information was provided by the system, or perceptual measurements of customer affective states.

In HMMs, a specific class in the classification system is modeled by a set of states that describes customer or system states, the joint probabilities of transitioning from any state to another state, the probabilities of each state being the initial state, a set of observable tokens corresponding to the measurement of the customer interaction of the system, and the probability of observing each token in any given state.

Figure 1:
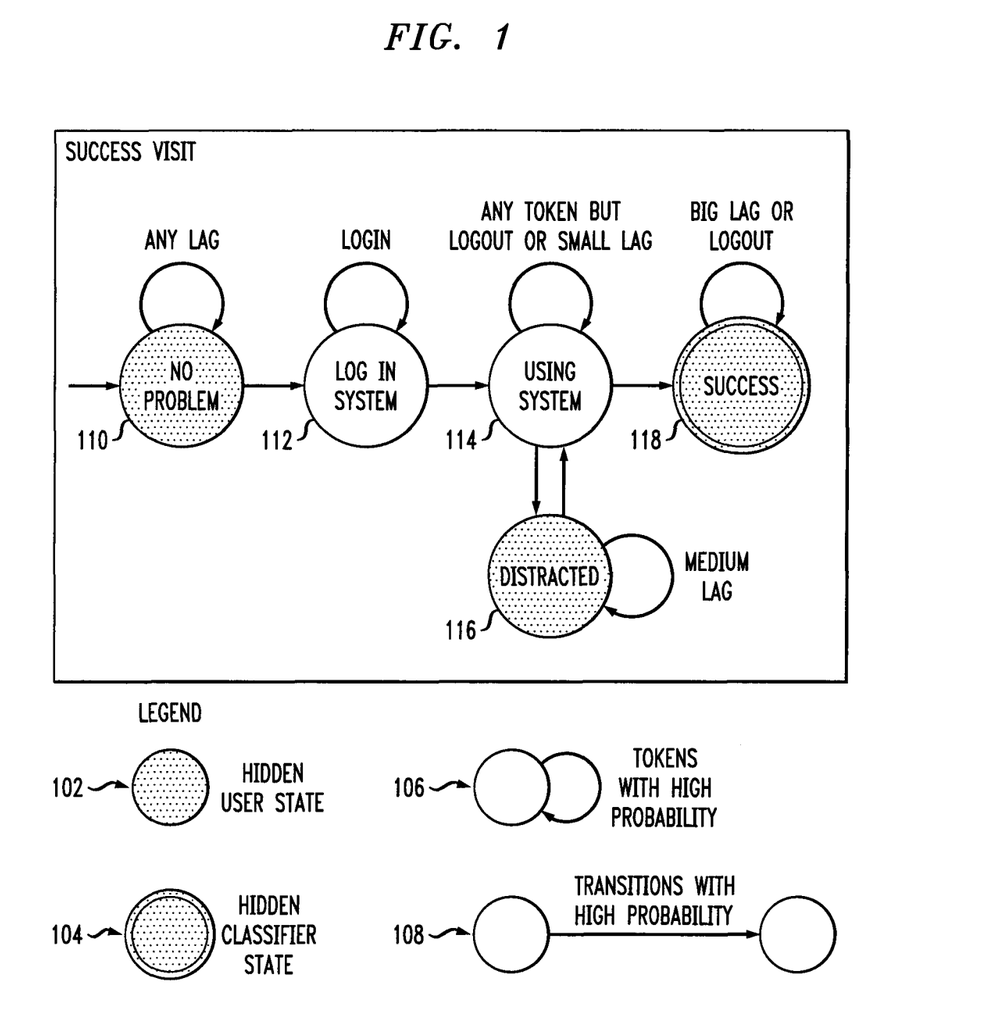
FIG. 1 is a diagram illustrating a Hidden Markov Model (HMM) describing the successful visit to an automatic technical support website, according to an embodiment of the present invention.

FIG. 1 is a diagram illustrating an HMM describing the successful visit to an automatic technical support website, according to an embodiment of the present invention. By way of illustration, FIG. 1 depicts hidden user states 102, a hidden classifier state 104, tokens with a high probability 106 and transitions with a high probability 108. FIG. 1 illustrates one case of a successful visit starts with the state 110 where the user has no problems, and the user logs into the system which is detected by the login action token, bringing the user to state 112. After login, any activity token but the logout token or small time lags keeps the user in state 114, while medium duration lags move the user to state 116. The logout token or a long time of inactivity signal the end of the interaction of the user with the system and move the user to state 118.

As illustrated, FIG. 1 depicts an example diagram representing a visit to an automated technical support system using HMMs. The actual probabilities are not displayed, but the arcs in the diagram represent the transitions with higher probability for each state, and the arcs within each state represent the tokens with higher probability to be observable in that state.

As detailed herein, given a sequence of observations O, an aspect of the invention classifies the sequence as follows. For each model $c_i$ from the set of models C, the probability of the observed sequence O being observed by the model is computed via $Pr(c_i|O)$. Each probabilistic model can be created manually by the developers of the system, and the probabilities associated with it can be determined manually by the developers of the system or found by standard training methods based on labeled data sets. In the particular case of HMM models, the probability of an observed sequence O being observed by the model can be computed by well known Forward/Backward procedures. Based on the probability of observing O of each model $c_i$, the observed sequence is classified, for example, by considering the model $c_i$ with the highest probability $Pr(c_i|O)$.

In an embodiment of the invention using HMMs, the probabilities of state transitioning, initial state likelihood, and token observing can be set manually based on known data about their relative distributions or via best guess estimates.

As also noted herein, in at least one embodiment of the invention, performance of can be improved by training the probabilistic models using labeled data sets. In this case, it is necessary to provide the system with a set of observable sequences $O_1, O_2, \ldots, O_k$ which have been labeled. That is, each observable sequence $O_j$ is assigned with its model $c_i$. Based on this labeled data set, it is possible to compute a set of probabilities of state transitioning, initial state likelihood, and token observing of each model $c_i$ such as that increases the likelihood of that model recognizing $O_j$ correctly. For example, it is possible to increase the transition probabilities between the states in $c_i$ that were actually observed in the sequence of observable states $O_j$. By doing this, it is more likely that an interaction sequence similar to $O_j$ will be recognized by the trained system as being $c_i$. It is to be appreciated by one skilled in the art that there are many different methods and criteria that can be used to re-compute the model probabilities. For example, a system based on HMMs can employ the known Baum-Welch re-estimation algorithm.

As additionally described herein, agent-generated information and machine-captured data can be combined and the combined data can be used to classify each customer contact. In such an embodiment of the invention, the agent generated information is translated into observable tokens, incorporated to the observable sequence, and classified as above.

Captured data can also be segmented into distinct contacts using the probabilistic models. In such an embodiment of the invention, a sequence of observations of customer interactions, for example, including many distinct contacts with the system, is segmented using the probabilistic models. Additionally, as noted herein, the captured data can include information about periods of time where the customer is not interacting with the automated system. In such an embodiment, the periods of "customer silence," that is, periods of time between observations, are mapped as tokens in the observable sequence. By way of example, FIG. 1 illustrates an example where different periods between observations are classified into small, medium, and large/big lags, and considered as observable tokens during the classification process.

An embodiment of the invention can also include adapting dynamic programming to be used in the context of customer contact with a customer support center. As used herein, dynamic programming refers to a set of know techniques in the field of computer science that break large and complex problems into sub-problems which can be solved separately without the context of the large problem. In the context of an embodiment of the present invention, information from the customer support center may allow the system to assert that subsequences of the probabilistic models are known to have happened, and therefore, making the recognition of the models which include that subsequence simpler and more robust.

Figure 2:
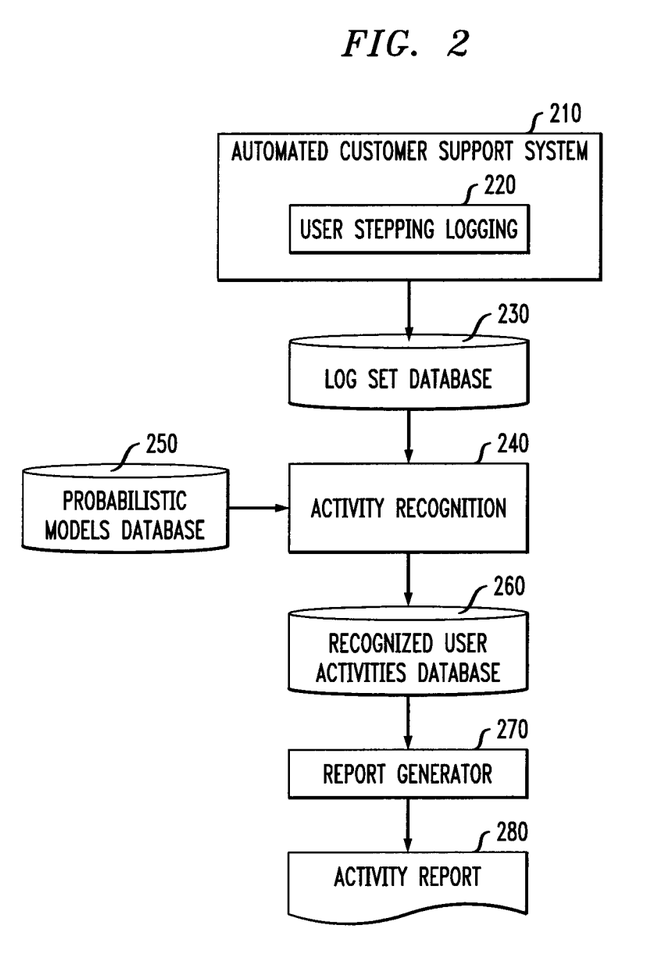
FIG. 2 is a block diagram illustrating an example embodiment, according to an aspect of the invention.

FIG. 2 is a block diagram illustrating an example embodiment, according to an aspect of the invention. By way of illustration, FIG. 2 depicts incorporating to an automated customer support system 210 a user step logging module 220 which generates log sets to be stored in the log set database 230 containing sequences of detectable steps of user activity with the automated customer support system 210. The sequences correspond to the activity of individual users. A log set from the log set database 230 can be used in real-time or offline as input to the activity recognition module 240 which implements the algorithms for recognition of the probabilistic models contained in the probabilistic models database 250. The most likely model for each sequence is stored into the recognized user activities database 260, which can be used by a report generator module 270 to create activity reports 280. In at least one embodiment of the invention, the activity recognition module 240 may also recognize a log set of an individual not as an individual activity but as a sequence of multiple activities corresponding to a sequence of probabilistic models.

Figure 3:
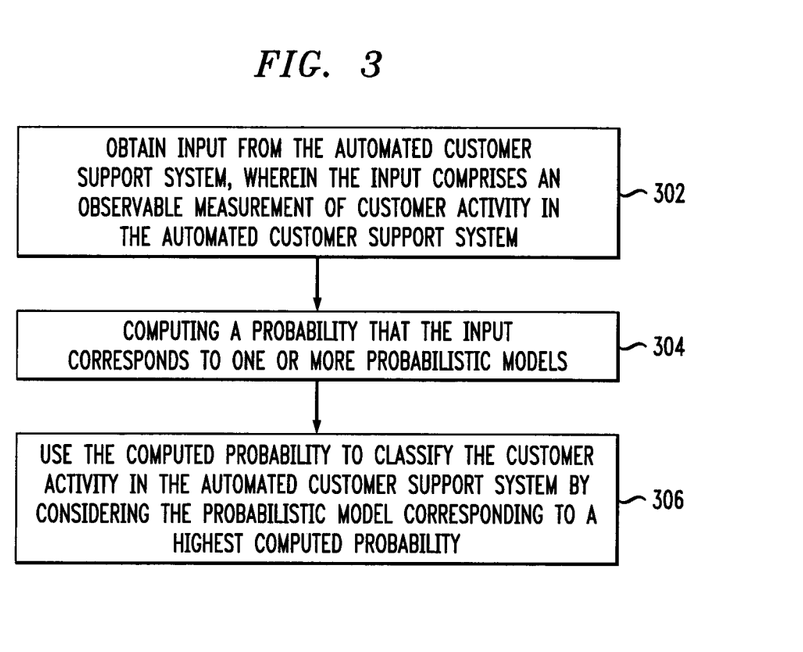
FIG. 3 is a flow diagram illustrating techniques for classifying customer activity in an automated customer support system, according to an embodiment of the invention.

FIG. 3 is a flow diagram illustrating techniques for classifying customer activity in an automated customer support system, according to an embodiment of the present invention. As described herein, the automated customer support system can include a voice-response system, an Internet-based system, etc. Step 302 includes obtaining input from the automated customer support system, wherein the input comprises an observable measurement of customer activity in the automated customer support system. This step can be carried out, for example, using a log set database (such as depicted as component 230 in FIG. 2).

Step 304 includes computing a probability that the input corresponds to one of one or more probabilistic models. This step can be carried out, for example, using the activity recognition module 240 of FIG. 2, using as input a log set from the log set database 230 of FIG. 2 and the probabilistic user activity models contained in the probabilistic models database 250 of FIG. 2. The probabilistic models can include Hidden Markov Models. Also, the probabilistic models can include hidden states, allowing for modeling of hidden states of a customer.

Step 306 includes using the computed probability to classify the customer activity in the automated customer support system by considering the probabilistic model corresponding to a highest computed probability. This step can be carried out, for example, using activity recognition module 240 of FIG. 2, and storing the results in the recognized user activities database 270 of FIG. 2.

The techniques depicted in FIG. 3 can additionally include training the probabilistic models using labeled data sets. Also, an embodiment of the invention includes combining agent-generated information and machine-captured data, and using the combined data to classify each customer activity in the automated customer support system. Further, the techniques depicted in FIG. 3 can include segmenting the obtained input into multiple distinct contacts using the probabilistic models using dynamic programming methods.

As detailed herein, in an embodiment of the invention, the obtained input includes information about periods of time when the customer is not interacting with the automated customer support system. Such periods of time where the customer is not interacting with the automated system can be mapped as tokens in an observable sequence of activity.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a user stepping logging module, an activity recognition module, and a report generator module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
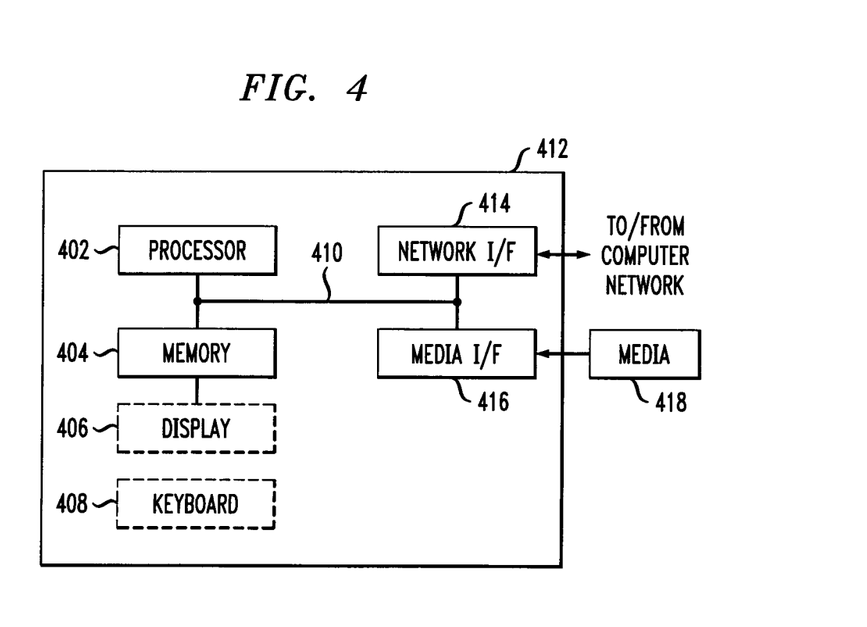
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/0 controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, classifying user activity in automated customer support systems using probabilistic models, without the need for user intervention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for classifying customer activity in an automated customer support system, wherein the method comprises:

obtaining input from the automated customer support system, wherein the input comprises an observable measurement of customer activity in the automated customer support system, and wherein said obtaining comprises obtaining said input after the customer activity in the automated customer support system has been completed;

computing a probability that the input corresponds to each of multiple probabilistic models, wherein each of said multiple probabilistic models corresponds to a type of customer activity associated with success or failure of a customer interaction with the automated customer support system; enabling multiple cues for determining the success of a customer interaction with the automated customer support system; and using the computed probability to classify the customer activity in the automated customer support system by identifying the probabilistic model corresponding to the highest computed probability;

wherein at least one of the steps is carried out by a computer device.

2. The method of claim 1, wherein the automated customer support system comprises a voice-response system.

3. The method of claim 1, wherein the automated customer support system comprises an Internet-based system.

4. The method of claim 1, wherein the multiple probabilistic models comprise multiple Hidden Markov Models.

5. The method of claim 1, wherein the multiple probabilistic models comprise multiple probabilistic models with hidden states, allowing for modeling of hidden states of a customer.

6. The method of claim 1, further comprising:
training the multiple probabilistic models using one or more labeled data sets.

7. The method of claim 1, further comprising:
combining agent-generated information and machine-captured data; and
using the combined data to classify each customer activity in the automated customer support system.

8. The method of claim 1, further comprising:
segmenting the obtained input into multiple distinct contacts using the multiple probabilistic models using dynamic programming methods.

9. The method of claim 1, wherein the obtained input includes information about one or more periods of time when the customer is not interacting with the automated customer support system.

10. The method of claim 9, wherein the one or more periods of time where the customer is not interacting with the automated system are mapped as one or more tokens in an observable sequence of activity.

11. An article of manufacture for classifying customer activity in an automated customer support system, comprising a non-transitory computer readable storage medium having computer readable instructions tangibly embodied thereon which, when implemented, cause a computer to carry out a plurality of method steps comprising:
obtaining input from the automated customer support system, wherein the input comprises an observable measurement of customer activity in the automated customer support system, and wherein said obtaining comprises obtaining said input after the customer activity in the automated customer support system has been completed;
computing a probability that the input corresponds to each of multiple probabilistic models, wherein each of said multiple probabilistic models corresponds to a type of customer activity associated with success or failure of a customer interaction with the automated customer support system; enabling multiple cues for determining the success of a customer interaction with the automated customer support system; and
using the computed probability to classify the customer activity in the automated customer support system by identifying the probabilistic model corresponding to the highest computed probability.

12. The article of manufacture of claim 11, wherein the multiple probabilistic models comprise one or more Hidden Markov Models.

13. The article of manufacture of claim 11, wherein the multiple probabilistic models comprise one or more probabilistic models with hidden states, allowing for modeling of hidden states of a customer.

14. The article of manufacture of claim 11, wherein the computer readable instructions which, when implemented, further cause a computer to carry out a method step comprising:
training the multiple probabilistic models using one or more labeled data sets.

15. The article of manufacture of claim 11, wherein the computer readable instructions which, when implemented, further cause a computer to carry out method steps comprising:
combining agent-generated information and machine-captured data; and
using the combined data to classify each customer activity in the automated customer support system.

16. The article of manufacture of claim 11, wherein the obtained input includes information about one or more periods of time when the customer is not interacting with the automated customer support system.

17. The article of manufacture of claim 16, wherein the one or more periods of time where the customer is not interacting with the automated system are mapped as one or more tokens in an observable sequence of activity.

18. A system for classifying customer activity in an automated customer support system, comprising:
at least one distinct software module, each distinct software module being embodied on a non-transitory tangible computer-readable medium;
a memory; and
at least one processor coupled to the memory and operative for:
obtaining input from the automated customer support system, wherein the input comprises an observable measurement of customer activity in the automated customer support system, and wherein said obtaining comprises obtaining said input after the customer activity in the automated customer support system has been completed;
computing a probability that the input corresponds to each of multiple probabilistic models, wherein each of said multiple probabilistic models corresponds to a type of customer activity associated with success or failure of a customer interaction with the automated customer support system; enabling multiple cues for determining the success of a customer interaction with the automated customer support system; and
using the computed probability to classify the customer activity in the automated customer support system by identifying the probabilistic model corresponding to the highest computed probability.

19. The system of claim 18, wherein the multiple probabilistic models comprise one or more Hidden Markov Models.

20. The system of claim 18, wherein the multiple probabilistic models comprise one or more probabilistic models with hidden states, allowing for modeling of hidden states of a customer.

21. The system of claim 18, wherein the at least one processor coupled to the memory is further operative for:
training the multiple probabilistic models using one or more labeled data sets.

22. The system of claim 18, wherein the at least one processor coupled to the memory is further operative for:
combining agent-generated information and machine-captured data; and
using the combined data to classify each customer activity in the automated customer support system.

23. The system of claim 18, wherein the obtained input includes information about one or more periods of time when the customer is not interacting with the automated customer support system.

24. The system of claim 23, wherein the one or more periods of time where the customer is not interacting with the automated system are mapped as one or more tokens in an observable sequence of activity.

* * * * *